June 2, 1942.                R. PERSINSKE                2,284,892
STEERING MECHANISM FOR VEHICLES
Filed Feb. 8, 1941                2 Sheets-Sheet 1
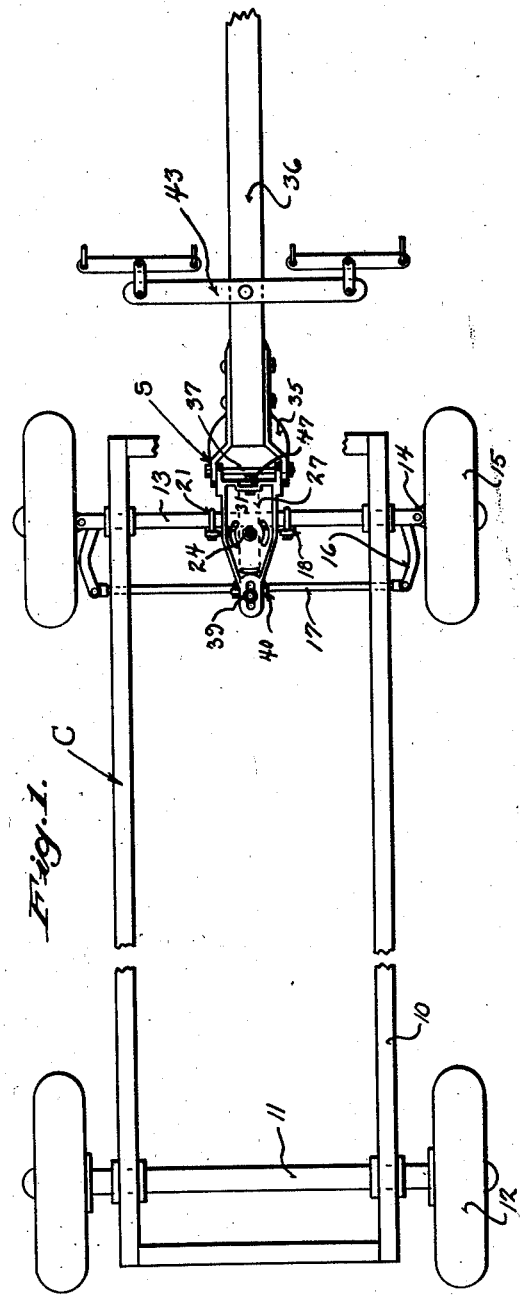
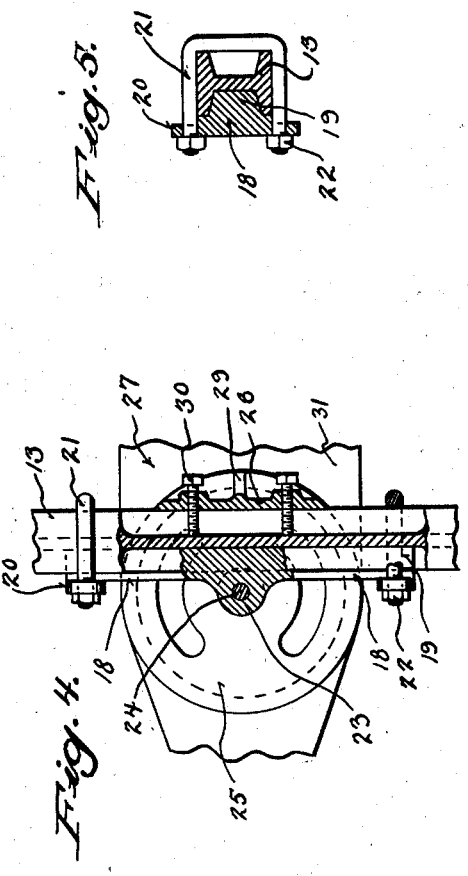
Inventor
R. Persinske
Attorneys

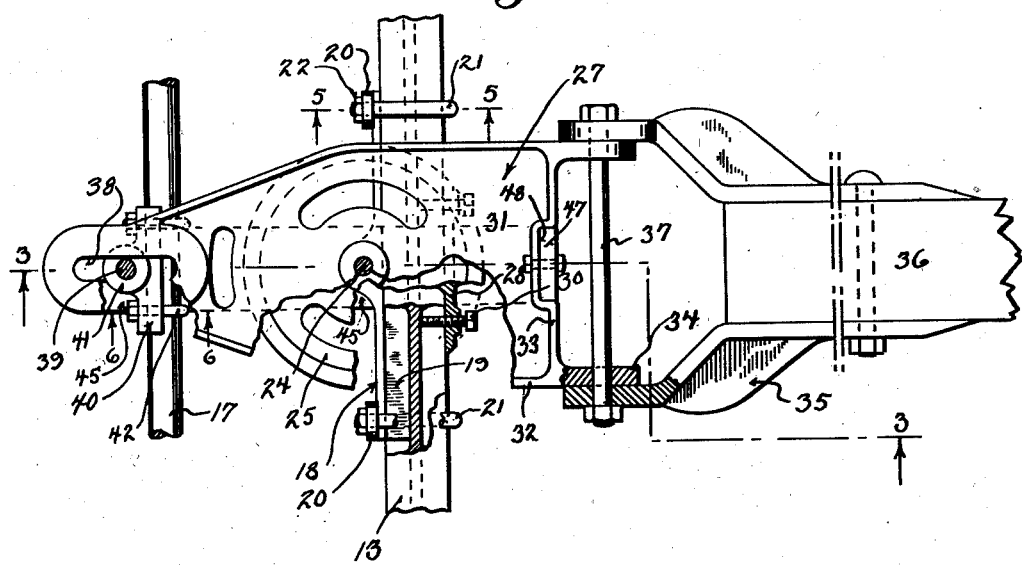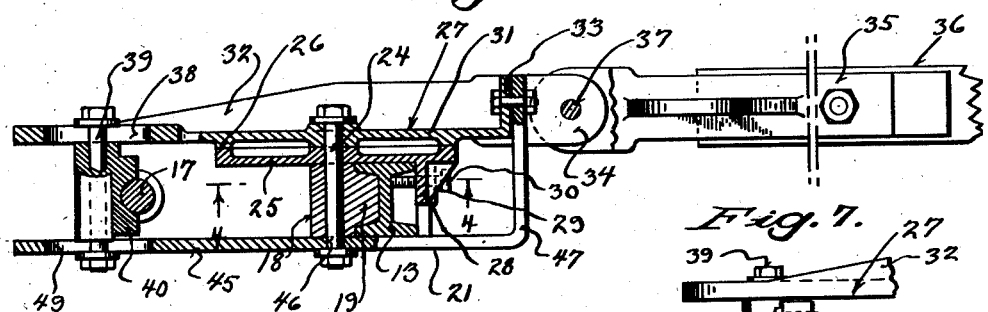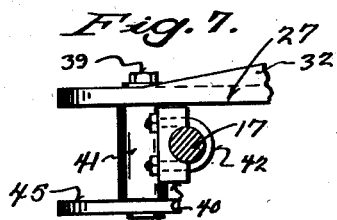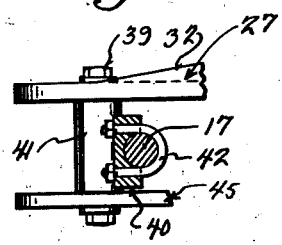

Patented June 2, 1942

2,284,892

UNITED STATES PATENT OFFICE 2,284,892

STEERING MECHANISM FOR VEHICLES

Reinhardt Persinske, Racine, Wis., assignor of one-half to Caspar W. Leinen, Racine, Wis.

Application February 8, 1941, Serial No. 378,011

5 Claims. (Cl. 280—33.55)

This invention appertains to vehicles, and more particularly to an improved steering mechanism for horse- or automobile-drawn wagons, trailers, etc.

One of the primary objects of the invention is to provide means operated from the tongue of the vehicle for actuating, in a convenient and simple manner, the swinging steering knuckles on which the front wheels are mounted, whereby the vehicle will readily track behind the draft animals or automobile.

Another salient object of the invention is to provide novel means for mounting the main steering lever on the axle for free turning movement and for connecting said lever to the tongue and the cross rod for the arms of the steering knuckles, so that a strong and rugged construction will be had to permit the effective drawing and backing of the vehicle.

A further important object of my invention is to provide novel means for clamping the turntable platform for the steering lever to the front axle, so as to permit the effective connection of the steering lever turntable with said platform.

A still further object of my invention is to provide a steering mechanism embodying a novel connection between the drawbar or tongue of the vehicle and the connecting cross rod for the arms of the steering wheel knuckles, so that the mechanism can be adjusted and readily associated with different types and characters of front vehicle steering assemblies, irrespective of the location of the connecting cross rod to the front axle.

With these and other objects in view, the invention consists in the novel construction, arrangement, and formation of parts, as will be hereinafter more specifically described, claimed, and illustrated in the accompanying drawings, in which drawings:

Figure 1 is a plan view of a chassis of a vehicle having my steering mechanism incorporated therewith.

Figure 2 is an enlarged, fragmentary, top plan view, with parts thereof broken away and in section, illustrating my steering mechanism.

Figure 3 is a longitudinal, sectional view through the steering mechanism, taken on the line 3—3 of Figure 2, looking in the direction of the arrows.

Figure 4 is a detail, horizontal, sectional view taken on the line 4—4 of Figure 3, looking in the direction of the arrows, illustrating the means for clamping the turntable platform to the front axle.

Figure 5 is a detail, transverse, sectional view taken on the line 5—5 of Figure 2, looking in the direction of the arrows, and illustrating the means for connecting the clamping bar to the front axle.

Figure 6 is a detail, sectional view taken on the line 6—6 of Figure 2, looking in the direction of the arrows, and illustrating the means utilized for connecting the main steering arm with the connecting cross rod of the steering knuckles.

Figure 7 is a view similar to Figure 6, but showing the bearing bracket member for the steering lever in a reversed position on the connecting cross rod, so as to permit the convenient connection of parts where the cross rod is located in a plane higher than that shown in Figure 6.

Referring to the drawings in detail, wherein similar reference characters designate corresponding parts throughout the several views, the letter C generally indicates the chassis of a vehicle, and S my improved steering mechanism therefor.

The vehicle chassis C can be of various characters according to the type of vehicle being built, and, as shown, the same includes a frame 10 to which is connected a rear axle 11 for supporting the rear wheels 12. The front of the frame has connected thereto a front dead axle 13, which can be of a channel or I-beam shape in cross section. The ends of the front dead axle 13 have pivotally secured thereto the steering knuckles 14, and front wheels 15 are rotatably mounted on the wheel spindles of said knuckles. The knuckles 14 also include rearwardly extending steering arms 16, which are connected by a cross rod 17.

My novel steering mechanism S includes a rugged clamp bar 18, which extends longitudinally of the front axle 13, and this bar is fitted against the rear face of the axle 13 and has formed thereon a rib 19, which fits in the axle for engaging the web and upper and lower flanges thereof. Pairs of ears 20 are formed on the ends of the clamp bar, and U-bolts 21 extend around the axle 13 and through said ears 20. Nuts 22 are threaded on the ends of the U-bolts for bringing the clamp bar and said bolts into intimate engagement with the axle. The central portion of the clamp bar 18 has formed thereon a vertically extending bearing 23, through which extends the king bolt 24.

Fitted upon the upper face of the clamp bar 18 is a circular platform 25 for the turntable 26 formed on the lower face of the main steering lever 27. The turntable platform 25 also rests on the upper face of the front axle 13 and is provided with a depending flange 28 for engaging the front of the axle 13. This flange 28 can be suitably reinforced by webs 29, and this flange carries adjustable set screws 30, which are adapted to be brought into binding contact with the axle 13 below the top flange thereof. The central portion of the platform 25 and the axial center of the turntable 26 of the lever 27 are provided with bearing openings, and the king bolt 24 extends through the openings for uniting the steering lever, the platform 25, and the clamp bar 18 together.

The main steering lever 27 is preferably formed from a single casting and includes a substantially flat body plate 31 on the lower face of which is formed the circular turntable 26, and the platform 25 and the turntable 26 give a large bearing area for effectively supporting the main steering lever to allow free and easy swinging movement thereof. The body plate 31 of the steering lever is reinforced by side and front flanges 32 and 33, and, if desired, the body plate can be cut out at different points to reduce the weight thereof.

Fitted upon the lower face of the clamp bar 18 and the axle 13 is a combined brace and steering bar 45 having a bearing opening 46 for the reception of the king bolt 24. The forward end of the brace and steering bar 45 has formed thereon a right-angularly extending arm 47, which is received and fastened in a notch 48 formed in the front of the main steering lever 27.

Formed on the front end of the main steering lever 27, which projects beyond the front axle 13, are pivot ears 34, and the opposite sides of the ears are engaged by the irons 35, which are firmly bolted to the tongue or drawbar 36 of the vehicle. A pivot bolt 37 connects the irons 35 and ears 34 together, so that the tongue can swing on said ears. The steering lever 27 extends in rear of the axle and is gradually tapered toward its rear end, and this end extends over the connecting cross rod 17 for the arms 16 of the steering knuckles.

The brace and steering bar 45, likewise, extends in rear of the axle 13 and under the rod 17 and a clamp bracket 40. A longitudinally extending slot 38 is formed in the rear end of the main steering lever 27, and a similar slot 49 is formed in the brace and steering bar 45, and these slots are adapted to receive a pivot bolt 39 carried by the bearing clamp bracket 40, which is adapted to be connected to the cross rod 17.

The bearing clamp bracket 40 includes a vertically disposed bearing sleeve 41, and the front face of the bracket is grooved to snugly receive and fit over the cross rod 17. U-bolts 48 extend through the clamp bracket 40 and around the cross rod for firmly uniting the clamp bracket with said cross rod. The pivot bolt 39 extends through the bearing sleeve as well as the slot 38 in the rear end of the steering lever, and suitable wear washers and nuts are employed for the bolt.

Particular attention is invited to the fact that the bearing sleeve 41 extends a greater distance above the body of the clamp bracket on one side than on the other. Thus, where the cross rods 17 of different steering assemblies are disposed higher or lower relative to the front axle, the position of the clamp bracket can be reversed (see Figures 6 and 7), and, thus, the clamp bracket can be arranged in a manner best suited for the particular steering assembly with which my mechanism is associated. Likewise, the slots 38 and 49 allow the pivot bolt 39 to be positioned at different places in rear of the axle to agree with the position of the cross rod 17 relative to the axle.

In use of my steering mechanism, the draft animals can be connected to the tongue 36 through any suitable draft appliance, indicated by the reference character 43 in Figure 1, or the tongue can be connected to a pulling vehicle, such as an automobile, tractor, or the like. When the tongue 36 is swung to the right or left, the steering lever 27 and brace bar 45 will be moved therewith, and due to the mounting of the lever 27 and brace bar 45 free swinging movement of these parts is assured. As the lever and bar swing, their movement will be transmitted to the cross rod 17 through the medium of the bolt 39 and bearing bracket 40, and, consequently, the cross rod will be shifted to the right or left, and this will actuate the steering knuckles 14 in the usual way.

Due to the connection of the clamp bar 18 and the platform 25 with the front axle 13, a firm connection is given, which will allow both the free pulling of the vehicle or the backing of the vehicle without undue strain on the king bolt.

Changes in details may be made without departing from the spirit or the scope of my invention, but what I claim as new is:

1. A steering mechanism for following vehicles comprising, a clamp bar, means for firmly securing the clamp bar to one face of the front axle of the vehicle, said clamp bar having a bearing, a turntable platform fitted upon the upper face of the clamp bar and adapted to engage the upper face of the axle, a depending flange on the platform for lying in front of the axle, set screws carried by the flange for engaging the axle, a main steering lever having a turntable for engaging the platform, a king bolt extending through the steering lever, its turntable, the platform, and bearing, a draft tongue pivotally connected to the steering lever, and means for pivotally connecting the rear end of the steering lever to the cross rod of a front vehicle steering assembly.

2. In a trailing vehicle, a dead axle, steering knuckles pivotally carried by the ends of the dead axle, a cross rod connecting the steering knuckles together, extending in parallel relation to the axle, a clamp bar extending longitudinally of the axle having a centrally disposed vertical bearing sleeve, means for rigidly securing the bar ot the axle, a circular platform having an axial opening in alinement with the sleeve resting upon the bar and axle, a depending front flange on the platform extending in front of the axle, set screws carried by the flange engaging the axle, a main steering lever having a circular turntable resting upon the platform and provided with an opening alining with the opening in the platform and bearing sleeve, a king bolt through the bearing sleeve and openings, a tongue pivotally connected to the front end of the lever, a bearing bracket rigidly secured to the cross rod, and means adjustably connecting the rear end of the lever to the bearing bracket.

3. In a trailing vehicle, a dead axle, steering knuckles pivotally carried by the ends of the dead axle, a cross rod connecting the steering knuckles together, extending in parallel relation to the axle, a clamp bar extending longitudinally of the axle having a centrally disposed vertical bearing sleeve, means for rigidly securing the bar to the axle, a circular platform having an axial opening in alinement with the sleeve resting upon the bar and axle, a depending front flange on the platform extending in front of the axle, set screws carried by the flange engaging the axle, a main steering lever having a circular turntable resting upon the platform and provided with an opening alining with the opening in the platform and bearing sleeve, a king bolt through the bearing sleeve and openings, a tongue pivotally connected to the front end of the lever, a bearing bracket rigidly secured to the cross rod, and means adjustably connecting the rear end of the lever to the bearing bracket, said bearing bracket including a bearing sleeve extending a greater distance above the body of the bracket on one side than on the other, the rear end of the lever having a slot, and a bolt extending through the slot and the bearing sleeve.

4. A steering mechanism for following vehicles comprising, a clamp bar, means for firmly securing the clamp bar to one face of the front axle of the vehicle, said clamp bar having a bearing, a turntable platform fitted upon the upper face of the clamp bar and adapted to engage the upper face of the axle, a depending flange on the platform for lying in front of the axle, set screws carried by the flange for engaging the axle, a main steering lever having a turntable for engaging the platform, a brace and steering bar extending over the axle, means securing the front of the brace and steering bar to the front end of the main steering lever, a king bolt extending through the steering lever, its turntable, the platform, bearing, and the brace and steering bar, a draft tongue pivotally connected to the steering lever, and means pivotally connecting the rear ends of the steering lever and the brace and steering bar to the cross rod of a front vehicle steering assembly.

5. In a trailing vehicle, a dead axle, steering knuckles pivotally carried by the ends of the dead axle, a cross rod connecting the steering knuckles together extending in parallel relation to the axle, a clamp bar extending longitudinally of the axle having a centrally disposed vertical bearing sleeve, means for rigidly securing the bar to the axle, a circular platform having an axial opening in alinement with the sleeve resting upon the bar and axle, a depending front flange on the platform extending in front of the axle, set screws carried by the flange engaging the axle, a main steering lever having a circular turntable resting upon the platform and provided with an opening alining with the opening in the platform and bearing sleeve and having a notch in its forward end, a brace and steering bar extending under the axle having a bearing opening alining with the opening in the platform and bearing sleeve, a king bolt extending through the bearing sleeve and the openings in the platform, turntable, and brace and steering bar, a right-angularly extending arm formed on the brace and steering bar received in the notch in the steering lever, means securing the arm to said lever, a tongue pivotally connected to the front end of the steering lever, a bearing bracket rigidly secured to the cross rod, means adjustably connecting the rear ends of the steering lever and the brace and steering bar to the bearing bracket, said means including a bolt extending through the bearing bracket and slots in the rear ends of the steering lever and brace and steering bar.

REINHARDT PERSINSKE.